Aug. 29, 1950 — B. C. VON PLATEN — 2,520,186
PROCESS FOR REMOVING DISSOLVED SALTS FROM THE LIQUID SOLVENT

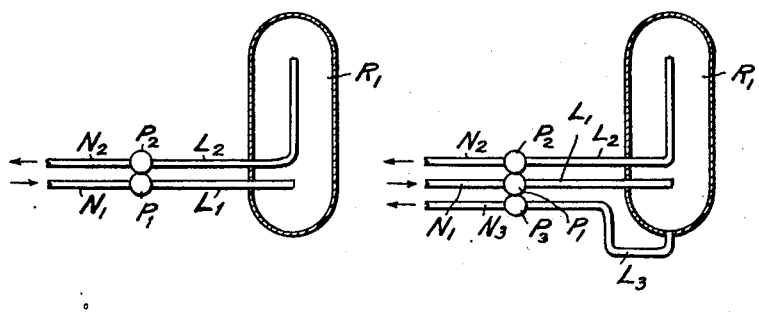
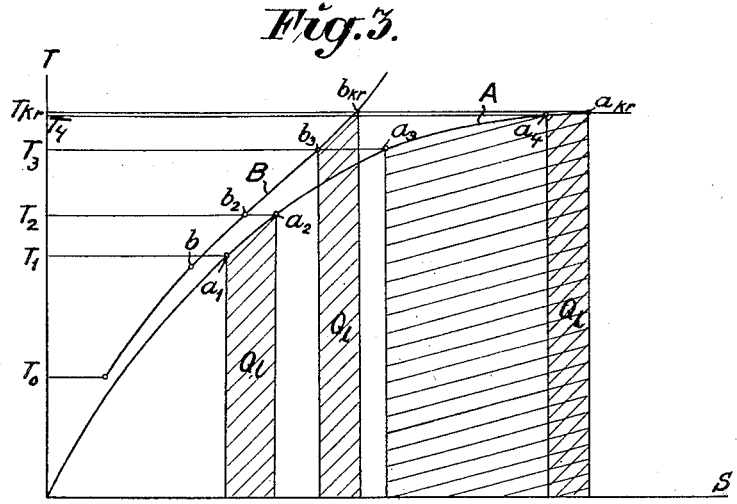

Filed Nov. 24, 1943 — 5 Sheets-Sheet 2

INVENTOR
BALTZAR CARL VON PLATEN

Henry C. Parker
ATT.

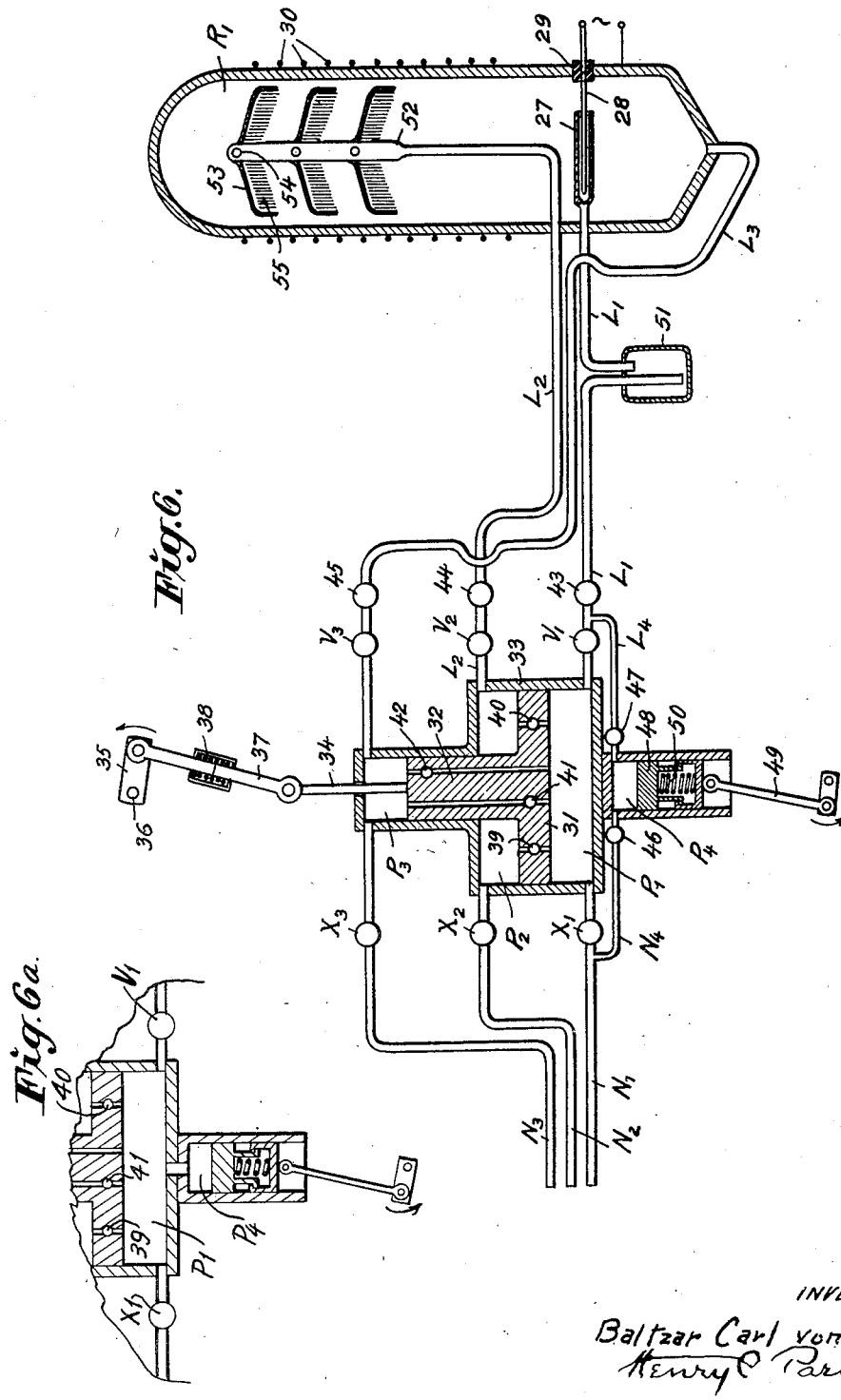

Aug. 29, 1950
B. C. VON PLATEN
2,520,186
PROCESS FOR REMOVING DISSOLVED SALTS FROM THE LIQUID SOLVENT
Filed Nov. 24, 1943
5 Sheets-Sheet 5
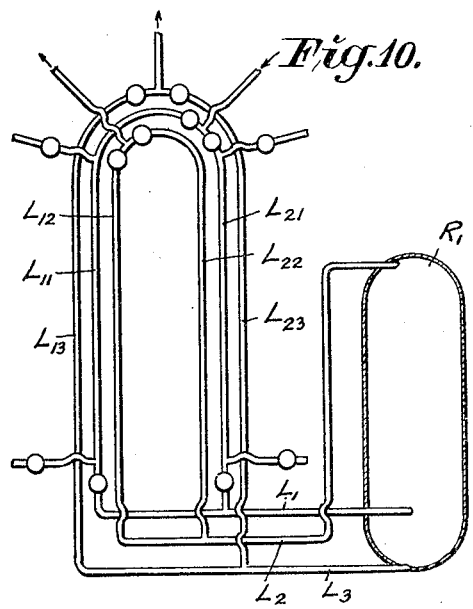
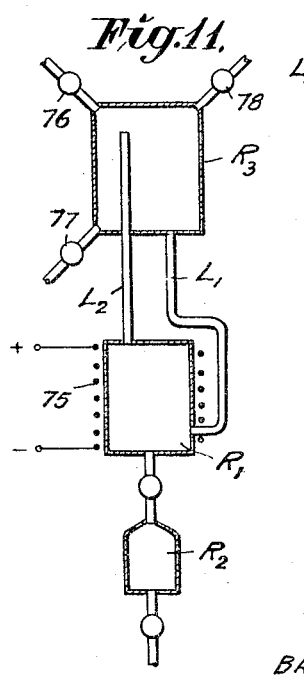
INVENTOR
BALTZAR CARL VON PLATEN
Henry C Parker
ATTY.

Patented Aug. 29, 1950

2,520,186

UNITED STATES PATENT OFFICE 2,520,186

PROCESS FOR REMOVING DISSOLVED SALTS FROM THE LIQUID SOLVENT

Baltzar Carl von Platen, Stockholm, Sweden

Application November 24, 1943, Serial No. 511,624
In Sweden November 13, 1942

Section 1, Public Law 690, August 8, 1946
Patent expires November 13, 1962

10 Claims. (Cl. 23—295)

The present invention relates to the problem of relieving liquid solvents, particularly water, from salts or other non-volatile substances dissolved therein. Such purification of solvents has hitherto generally been effected through distillation by boiling the solution and condensing the driven-off vapors of the solvent in a cool receiver or condenser, involving the expenditure of much more energy than is theoretically necessary.

It is a general object of this invention to provide a novel purifying method, which will permit the purification of solutions at a very small expenditure of energy, and also an apparatus for effectively carrying out such novel method. More particularly, it is an object of the invention to provide a method and an apparatus which renders possible the economic production on a large scale of fresh water from sea-water in localities, where the sources of fresh water do not suffice to meet the demands of city water works or other big consumers. Another important application of the invention is the production of drinking water from sea-water on board of ships.

In its more particular aspects the invention is based on my observation that at pressures considerably exceeding the critical pressure the conditions for regaining the heat used for raising the temperature of the solution are much more favourable than at the critical pressure.

Accordingly, the method according to the invention for relieving a liquid solvent, particularly water, of salts or other non-volatile substances dissolved therein consists in subjecting the solution to a pressure which exceeds the critical pressure as referred to the pure solvent, preferably to a considerable extent, raising the temperature of the solution while maintained under such high pressure to a point above the critical temperature as referred to the pure solvent, separating the solvent from the concentrated salt solution then formed, and cooling the separated solvent and, if desired, also the concentrated solution by causing it or them, while still maintained under the high pressure, to give off heat to the solution to be purified.

Other objects and features of the invention will become apparent from the following detailed description of various embodiments with reference to the accompanying drawings.

In said drawings:

Figs. 1 and 2 illustrate diagrammatically the principles of the invention.

Fig. 3 is a temperature-entropy diagram.

Fig. 6 shows a preferred embodiment of the purifying apparatus.

Fig. 6a shows a modification of the apparatus of Fig. 6.

Fig. 10 shows a double heat exchanger connected to the pressure receiver.

Fig. 11 shows a purifying apparatus devoid of pumps or sluices.

Fig. 12 shows a manner of heat-insulating the pressure receiver.

Figure 4:
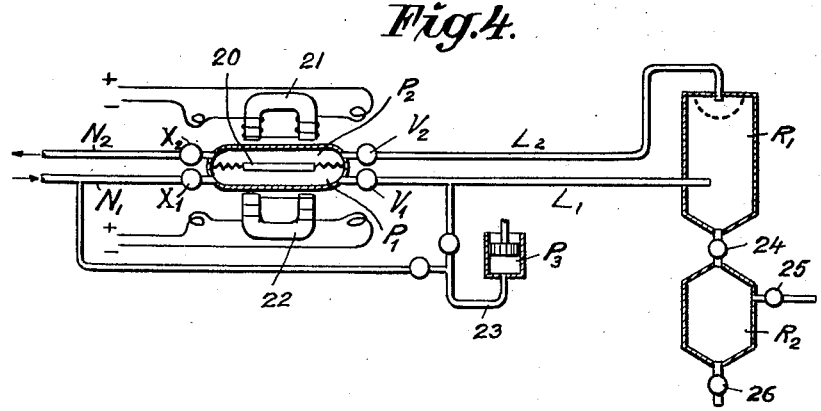
Fig. 4 shows a first embodiment of a purifying apparatus according to the invention.

According to Fig. 1, the solution to be purified, for instance sea-water, is pumped by means of the pump $P1$ through the conduits $N1$ and $L1$ into the lower part of the receiver $R1$ under a pressure which exceeds the critical pressure for the pure water. A corresponding volume of liquid is discharged from the upper part of the receiver $R1$ through the conduits $L2$ and $N2$ over a counter-pressure pump $P2$. The pump $P1$ in the supply conduit $N1$, $L1$ is coupled against the pump $P2$ in the discharge conduit $L2$, $N2$, whereby the work required to operate the pumps is reduced to a minimum. Heat is supplied to the solution in the pressure receiver $R1$ from an external source, not shown. To reduce the quantity of heat to be taken from said source the discharge conduits $L2$, $N2$ are thermally connected with the supply conduits $L$, $N1$ so as to form together a temperature or heat exchanger which works according to the counter-current principle. Furthermore, the whole apparatus is effectively heat insulated from the surroundings.

When the sea-water, after having entered the receiver $R1$, passes its critical temperature, and is separated into two components, one being vaporized pure water and the other concentrated salt solution which later gravitates to the bottom of the receiver, whereas the vapor of the solvent, in this case fresh water, flows upwardly in the receiver and is discharged through the conduits $L2$, $N2$ while giving off the major part of its heat to the quantities of sea-water flowing towards the receiver through the supply conduits $N1$, $L1$. As soon as its temperature falls below the critical temperature it again condenses to liquid. The concentrated solution accumulating at the bottom of the receiver may be removed from time to time.

The apparatus shown schematically in Fig. 2 differs from the one shown schematically in Fig. 1 substantially only therein, that is provided with a second discharge conduit L3, N3, which extends from the bottom of the receiver R1 and serves for the continuous discharge of concentrated salt solution. The said discharge conduit L3, N3 contains a second counter-pressure pump P3 which is also coupled against the pressure pump P1, and furthermore the said conduit is thermally connected with the supply conduit N1, L1, to form part of the temperature or heat exchanger. The operation of this modified apparatus will be readily understood.

I have found that both the above apparatus operate satisfactorily as far as the separation of the salts from the sea-water is concerned, provided that the pressure of the sea-water in the system is maintained above the critical pressure as referred to pure water, and that all the sea-water passing through the receiver is raised to a temperature as referred to pure water exceeding the critical temperature. There is a considerable difference, however, in thermal efficiency, depending upon whether the pressure used is near the critical pressure or exceeds the critical pressure considerably. In the former case the losses in the heat exchanger have been found to be very high, and it is not possible to reduce them to any great extent by an increase of the size of the heat exchanger, whereas in the latter case a heat exchanger of moderate dimensions has been found to be capable of transmitting practically all of the heat contained in the discharged fresh water and concentrated salt solution to the sea-water which is supplied to the receiver to become purified. The reasons herebefore will be readily understood from the following discussion, which particularly applies to the continuously operating apparatus according to Fig. 2.

In Fig. 3 there is shown a so-called temperature-entropy diagram, the ordinates representing absolute temperature T and the abscissas the entropy S. This is obtained from the formula $$S = \int \frac{dQ}{T}$$

where Q represents a quantity of heat. In this diagram the changes of conditions of sea-water will be studied provided the concentration of salt there is small and when heated under a constant pressure from the ambient temperature $T_o$ to the critical temperature $T_{kr}$. If the constant pressure is equal to the critical pressure a curve A is obtained and if the constant pressure exceeds the critical pressure of pure water a curve B is obtained. As seen from Fig. 3 the derivative of the curve A equals zero at the critical temperature, whereas for the curve B the derivative is always positive.

We will now assume that the same curves A and B also represent the superposition of the changes of conditions of the purified water and the concentrated salt solution between the temperatures $T_{kr}$ and $T_o$, i. e. that for each arbitrary temperature between said temperature limits, at a constant pressure, the product of the absolute weight of the salt solution (the sea-water) and its specific heat equals the summation of the corresponding products of its components (the concentrated salt solution and the purified water), this assumption being in most cases a permissible approximation.

This involves in other words that the amount of heat required to raise the temperature of the salt solution (the sea-water) from the ambient temperature to the critical point or the higher point that may be reached, for each arbitrary temperature interval equals the amount of heat that must be withdrawn from the purified water and the concentrated salt solution to lower their temperatures the same interval.

We will further assume that the loss of heat in the temperature or heat exchanger amounts to a fixed value $Q_1$.

The permissible temperature difference between the salt solution, on the one hand, and its components, on the other, in an arbitrary point of the heat exchanger can now be found in a simple manner.

Let us assume that the pressure is the critical pressure $P_{kr}$ and that it is desired to know the temperature of the components at that point of the heat exchanger, at which the salt solution (the sea-water) has the temperature $T_1$. The ordinate $T_1$ corresponds to the point $a_1$ on the curve A. We then first have to find on the curve A a point $a_2$ positioned at such a distance to the right of the point $a_1$ that the shaded area under the curve section $a_1$—$a_2$ equals the amount $Q_1$. The same applies to all parts of the curve A. The conditions will, however, be peculiar adjacent to the critical point $a_{kr}$ due to the fact that the derivative is approaching zero in this part of the curve A. If the thermal losses are to be kept within the amount $Q_1$ the heat exchanger must be so dimensioned that a temperature difference of only $T_{kr}$—$T_4$, corresponding to the cross-hatched surface under the curve portion $a_4$—$a_{kr}$ is required to establish the necessary amount of heat transfer in the heat exchanger. As the transfer capacity of a heat exchanger is proportional to the product of its transfer surface and the drop of temperature between the two media, the very low temperature drop here in question will necessitate the provision of an exceedingly large heat transfer surface, involving high plant costs. If instead the pressure exceeds the critical pressure, the curve B applies, meaning that then the area below the curve section $b$—$b_2$ must be equal to $Q_1$. Since the curve B is steeper than the curve A or, in other words, the derivative $$\frac{dT}{dS}$$

for an arbitrary point on the curve B is always greater than the derivative for a point on A having the same ordinate, and if the temperature $T_2$ applies to both points $a_2$ and $b_2$, it follows that the temperature drop $T_2$—$T_1$ is less than the drop $T_2$—$T_b$ in that order to establish the same loss $Q_1$.

This difference is still more pronounced near the critical temperature $T_{kr}$, where the temperature difference becomes $T_{kr}$—$T_4$ when according to curve A the pressure equals the critical pressure, but becomes $T_{kr}$—$T_3$ at the higher pressure according to points $b_{kr}$ and $b_3$ of curve B. As will be readily seen $T_{kr}$—$T_4$ is very small, involving that when the pressure only equals the critical pressure the high-temperature zone of the heat exchanger must be given an immensely large surface if it shall be possible to keep the loss down at the permissible value $Q_1$. If the pressure is raised the allowable temperature difference rapidly increase to $T_{kr}$—$T_3$ permitting the necessary transfer surface area in the heat exchanger to be decreased accordingly.

If it is decided instead that the salt solution (the sea-water) in the heat exchanger shall be heated to the temperature T3 both in case of the higher pressure (curve B) and in case of the critical pressure (curve A), the loss will be the shaded area below the curve portion $b3-bkr=Q1$ in the first case and the very much larger area below the curve portion $a3-akr$ in the other case which latter loss is much greater than the permissible value $Q1$.

What has been said above holds true also if the pressure is raised in more than one step and one separate temperature exchanger is provided for each pressure range.

We have thus proven the fundamental importance of a raise of the pressure for the exchange of heat and thus also for this invention. We have then used an approximation, it is true, but an exact treatment of the problem, in which regard should be taken in the first instance also to the difference between the critical temperature for the salt solution (the sea-water) and the pure solvent (fresh water), would only enhance the importance of a rise of pressure above the critical pressure. How far the pressure should be raised in each individual case is a matter of economy. Initially much is gained by raising the pressure, but above a certain limit no gain worth mentioning will be had. For sea-water it should suffice to raise the pressure from the critical pressure for pure water of about 224 kg./cm.$^2$ to a pressure of approximately 300 to 350 kg./cm.$^2$. A further increase of pressure results in such an insignificant reduction of the dimensions of the heat exchanger that it would not be technically well founded.

I shall now proceed to describe various practical embodiments of the apparatus for carrying out my purifying method.

In the apparatus shown schematically in Fig. 4, the pumps consist of the two parts P1 and P2 of a diaphragm housing, the diaphragm of which may be provided with a preferably chrome-plated iron disk 20. Cooperating with said iron disk are two electromagnets 21 and 22, the windings of which are included in circuits also containing operating windings for valves X1, V1 and X2, V2 in the supply and return conduits N1, L1 and L2, N2. A small pump P3 is provided for pumping extra quantities of sea-water into the high pressure supply conduit L1 at the low-temperature side thereof.

It shall now be assumed that the energization of the circuit containing the electromagnet 21 causes the valves V1, V2 to close and the valves X1, X2 to open a moment later, whereupon the iron disk 20 is attracted, causing sea-water to be sucked into the space P1 below the diaphragm and purified water to be driven out from the space P2 above the diaphragm through the conduit N2. When thereafter the circuit of the electromagnet 22 is energized, the valves X1, X2 are closed and the valves V1, V2 opened a moment later. The attraction of the disk 20 will now cause sea-water to be pumped into the receiver R1 through the conduit L1 and purified water to be displaced from the receiver R1 and the conduit L2 to the space P2. By alternately energizing the circuits of the electromagnets 21 and 22 a continuous sluicing of liquid through the system in the desired direction may thus be effected, while the desired pressure is maintained by the small pump P3. In certain cases said extra pump may be dispensed with, however, because of the increase of volume on account of the separation of concentrated salt solution in the receiver R1. In the event of a very high percentage of salt in the solution and a consequent high increase of volume it may even be necessary to provide in place of the pump a safety valve, which intermittently releases a certain quantity of water in order that the pressure shall not rise above the permissible value.

With regard to the extra pump P3 it is to be noted that its valves should be positioned at a certain distance from the pump piston in order to prevent oil from entering the sea-water. For said purpose a U-shaped connecting tube 23 for the pump may be provided.

Concentrated salt solution may be drawn from the bottom of the receiver continuously or by means of a sluice.

Where the discharge conduit L2 leaves the receiver R1 a filter may be provided, which prevents any finely divided precipitated salt from being flushed out by the fresh water.

Figure 5:
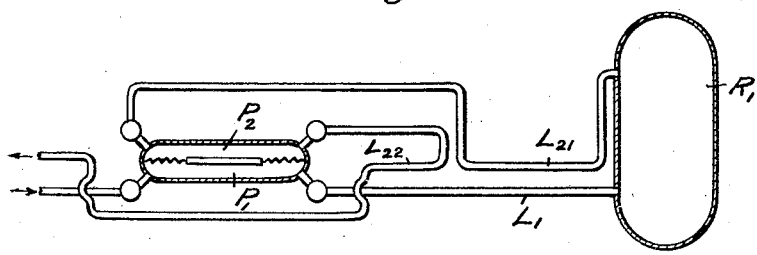
Fig. 5 shows a modified detail of Fig. 4.

In the modified apparatus shown in Fig. 5 the discharge conduit is divided in two parts L21 and L22, which are in heat conducting relationship with the high pressure part of the supply conduit L1. The return part P2 of the diaphragm pump is inserted between and in series with said parts and is therefore passed by a purified solvent, which has a higher temperature and consequently a lower volumetric weight than the solution which simultaneously passes through the delivery part P1 of the pump. This involves that the total weight of sea-water pumped into the receiver R1 during a certain interval of time will exceed the total weight of the purified water leaving the receiver during the same time. This surplus of material added to the receiver will compensate for unavoidable "sluicing" losses in the pump due to elasticity and the like.

To reduce the transmission of heat between the two parts P2 and P1 of the diaphragm housing the single diaphragm may be substituted by a plurality of diaphragms positioned one above the other. Obviously, the upper one of the two diaphragm housing parts should be the hot one.

In Fig. 6, which illustrates a preferred embodiment of an apparatus for carrying out my purifying method, R1 designates as before the pressure receiver, L2, N2 the discharge pipe for the fresh water and L3, N3 the discharge pipe for the concentrated salt solution. The pipes N1, N2, N3 and L1, L2, L3 respectively form together temperature exchangers, so that the sea-water or other solution to be purified enters the receiver R1 at a temperature only slightly below the temperature at which the pure solvent leaves the receiver.

In the receiver R1 the supply pipe L1 opens into a tube 27 which serves as one electrode in an electric water heating circuit, the other electrode 28, which is insulated from the receiver R1 by means of the leading-in insulator 29, being in the form of a rod which is inserted into the tubular electrode 27. When alternating potential is impressed on the electrodes 27, 28, an electric current will pass through the conductive sea-water between the electrodes, raising the temperature of the sea-water according as it flows along the tube. At that point in the tube, where a certain temperature is reached the liquid is divided into two layers the upper one of which is pure water in its vapor phase whereby the conductivity of the liquid is reduced almost to zero above the boundary between the two layers. Consequently, no current can pass between the electrodes beyond that point, whereby the supply of extra heat is automatically restricted to the quantity required to raise the temperature just to a temperature required to cause the division of the liquid at the prevailing pressure. Because of unavoidable losses from the pressure receiver R1 to the surroundings it is, however, in practice necessary to raise the temperature of the liquid above the critical temperature of pure water. Said additional heat may be supplied as shown by means of an electric resistance wire 30, wound around the upper portion of the receiver R1 underneath the heat insulation, not shown. Since this additional quantity of heat is comparatively very small, there is no need for any regulation of the supply of energy at this point.

It is quite obvious that the supply of extra heat to the receiver R1 may be effected in any other suitable manner than that shown.

The pump or sluice used for raising the pressure of the sea-water to a value exceeding the critical pressure and for lowering the pressure of the separated components thereof to atmospheric pressure is in this embodiment a piston type pump or sluice having two pistons 31 and 32 of different diameters, which pistons are built together to form a piston unit 31—32. The piston unit 31—32 is reciprocable in the cylinder housing 33. The common piston rod 34 is coupled to a crank 35 on a crank shaft 36 through the intermediary of a crank rod 37, which for reasons which will be apparent in the following consists of two parts coupled together by a spring device 38, which yields in either direction in case the compressing or pulling force in the piston rod should exceed a predetermined value. Safety valves 39, 40, 41 and 42 are provided in channels in the piston unit which connect the pump spaces P1 and P2 at opposite sides of the piston 31 and the pump spaces P1 and P3 at opposite sides of the piston 32 with each other.

The valves X1, X2, X3 and V1, V2, V3 in the supply and discharge pipes respectively are operated in timed relation to the movements of the piston unit 31—32, preferably from the crank shaft 36. When the piston unit 31—32 performs its upstroke as shown in the figure, the valves X1, X2 and X3 are open and the valves V1, V2 and V3 closed. Sea-water is then sucked through the pipe N1 into the pump space P1, while purified water is discharged from the pump space P2 through the pipe N2 and concentrated salt solution discharged from the pump space P3 through the pipe N3. Immediately before the piston unit has reached its upper turning point, the valves X1, X2, X3 are closed, whereupon a brief moment later the valves V1, V2 and V3 are opened. Sea-water is then during the down-stroke of the piston driven through the valve V1 and the pipe L1 into the pressure receiver R1, while simultaneously purified water is sucked from the top of the pressure receiver R1 through the pipe L2 and the valve V2 into the cylinder space P2 and concentrated salt solution from the bottom of the receiver through the pipe N3 and the valve V3 to the cylinder space P3. During the interval of time, when all the valves X1, X2, X3 and V1, V2, V3 are closed simultaneously, the movement of the piston unit 31—32 is momentarily interrupted, the spring device 38 in the piston rod 37 then yielding, so that unpermissible mechanical stresses are avoided.

The reason for keeping all the valves closed at the same time during a brief moment in connection with the change of direction of the piston is to prevent pressure loss in the system. To avoid leakage of salt water from the cylinder spaces P1 and P3 to the cylinder space P2, which contains fresh water, the valve V2 should be timed to open a little earlier than the valves V1 and V3. This ensures that the pressure rise always will begin in the cylinder space P2. A possible leakage of fresh water into the sea-water or the concentrated salt solution would obviously do little harm.

In the pipes L1, L2, L3 there are also provided non-return valves 43, 44, 45, which are arranged to shut off or choke said pipes in response to a predetermined velocity of flow in the direction from the pressure receiver R1 towards the pump, for instance in the case of a faulty valve.

In the pump shown in Fig. 6 the summation of the sucked-in volumes of the purified water and concentrated salt solution is obviously so much smaller than the volume of the sucked-in sea-water as the volume obtained by multiplying the cross-sectional area of the piston rod 34 by the length of stroke. Consequently, the piston rod 34 acts as a pump which pumps sea-water into the system. This action of the piston rod is favourable for the following reason. The mean value of the specific weight of the purified water and of the concentrated salt solution at a pressure of 300 atmospheres is higher than the specific weight of the sea-water at atmospheric pressure. Since, furthermore, the absolute weight is equal to the specific weight multiplied by the volume, the weight of the sea-water entering the system would be smaller than the weight of the purified water and concentrated salt solution leaving during the same interval of time, unless a greater volume were actually supplied than that discharged. If the piston rod is exclusively relied upon to supply the additional volume of sea-water necessary to sustain the pressure in the system, the piston rod must in practice be somewhat over-dimensioned, so that a greater volume of liquid is delivered to the receiver than that really required. The surplus may then be taken care of by a safety valve, not shown.

Alternatively and preferably the necessary additional volume of sea-water may be supplied to the pressure receiver R1 by means of the extra pump P4 shown in Fig. 6. Said pump is a piston type pump, the suction pipe N4 of which is connected to the source of sea-water over a self-controlled non-return valve 46 and the delivery pipe L4 of which is connected over a self-controlled non-return valve 47 to the supply pipe L1 between the valves V1 and 43. The piston 48 of the pump P4 is coupled to the piston rod 49 through the intermediary of a spring coupling 50, which yields when the pressure in the cylinder space P4 exceeds the pressure to be maintained in the system. When an extra pump P4 is used, the piston rod 34 for the main pump should preferably be underdimension, so that the piston rod will pump less water into the system than the quantity required, the balance being supplied by the extra pump.

The extra pump P4 may alternatively communicate with the cylinder space P1, in which case the valves 46 and 47 are not needed. A construction of this type is shown in Fig. 6a.

Another manner of limiting the pressure in the system is to provide in the suction pipe N1 an extra valve, not shown, which is responsive to the pressure in the system in such a way that when the pressure exceeds its permissible value the valve shuts off the supply of sea-water during the last part of the upstroke of the piston unit 31—32. This arrangement may involve the inconvenience, however, that when the sea-water under the piston 31 starts to boil on account of the vacuum created, air will be liberated and collect as a cushion immediately below the piston 31. During the following down-stroke of the piston the air cushion just boiled off is immediately dissolved again, but only in the upper layers of the water. The temperature exchanger will thus receive under the high total pressure one portion of water in which the partial pressure of the air is lower than one atmosphere and another portion in which the partial pressure of the air may be almost equal to the total pressure, i. e. that portion of the water which during the downstroke was forced under the action the high pressure to dissolve the small air cushion under the piston 31. As a consequence, the portion of the water thus made rich in air will give off air in the heat exchanger on account of the temperature rise in the latter, causing the formation of boilerscale in the temperature exchanger, in that, as is known, it is a condition for the agglomeration of the crystals of gypsum or the like that the crystals are surrounded by a gas, for instance air or superheated steam. When therefore an extra pressure-controlled shut-off valve is used in the suction pipe N1 as a pressure limiting device, a water mixing device, not shown, should be inserted in front of the temperature exchanger, so that the partial pressure of the air contained in the water flowing into the temperature exchanger shall not in any portion of the water exceed such a value that air bubbles will form on account of the temperature rise in the temperature exchanger.

Certain of the salts dissolved in the sea-water, particularly the gypsum, precipitate already at the temperature prevailing in the pipe L1 of the high pressure temperature exchanger, i. e. long before the critical temperature is reached. Preferably a settling tank 51 or other separating device is therefore inserted in the pipe L1 to take care of the precipitates. In addition a filter of some kind, not shown, could be placed in the pipe L1 where it opens into the pressure receiver R1.

In certain cases it may be advisable to relieve the sea-water or other solution of the air dissolved therein before admitting it to the temperature exchanger, preferably by evacuation in a suitable auxiliary apparatus.

The separation of the concentrated salt solution from the solvent in the pressure receiver R1 does not meet with any difficulty, but nevertheless it should be given some attention. The discharge pipe L2 for the fresh water may connect within the receiver R1 to a vertical pipe 52, which is closed at its upper end. The upper portion of said pipe 52 carries a number of umbrellalike screens 53, and below each screen holes 54 are provided in the pipe. On the underside of each screen there are filters 55. The purified water, which as previously mentioned has a temperature higher than the critical one and is in its vapor phase, passes up through the filters while any precipitations are filtered off, the fresh water flowing through the holes 54 to the pipe 52 and further to the pipe L2, i. e. to the heat exchanger, from where it is discharged to the atmosphere.

The filters may have pore openings that are smaller or larger than the smallest grain of salt that it is desired to filter off. In the former case the filter will operate in the ordinary way, in the latter case it only serves to prevent eddy currents in the water from transporting salt up to the holes 54 and into the pipe 52. In the latter case the velocity of flow through the filter must be somewhat smaller than the velocity of gravitation of the smallest salt particle which is permitted to be discharged together with the purified water. The filter may then be made simply in the form of a spiral wound from a corrugated metal band. The screens are made sloping in order to secure that salt which drops from an upper screen shall slide down and collect at the bottom of the receiver R1, from where the concentrated salt solution is carried off through the discharge pipe L3.

Figure 7:
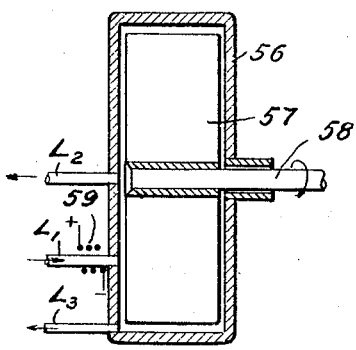
Fig. 7 shows a modified device for separating the precipitated salt from the solvent.

Another and more effective way of separating the concentrated salt solution from the fresh water or other solvent is illustrated in Fig. 7. According to said figure, the receiver R1 of the embodiments previously described has been substituted by the housing 56 of a centrifugal apparatus, the paddle wheel 57 of which is mounted on a horizontal shaft 58. The sea-water under high pressure enters the housing through the pipe L1 after its temperature has been raised above the critical temperature through supply of extra heat, for example by means of the electric heating coil 59, whereby it follows that the concentrated salt solution has already been formed when the liquid enters the housing. Due to the centrifugal action the heavy brine is separated from the solvent in the housing 56, the fresh water being discharged from the housing through the pipe L2 while the brine is being flushed out together with a certain amount of the solvent through the pipe L3.

Figure 8:
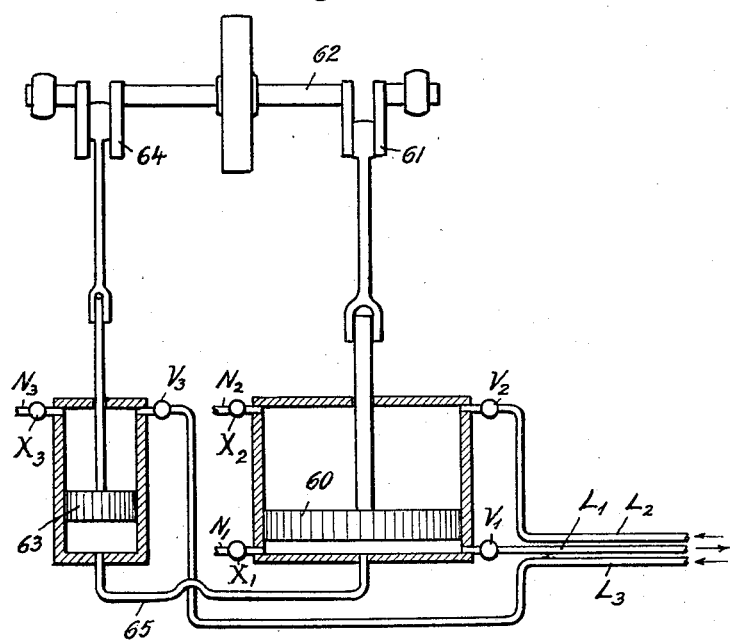
Figs. 8 and 9 show two modified pump or sluice arrangements.

In Fig. 8 is shown a modified pump arrangement, comprising two individual double-acting piston pumps of different size. The piston 60 of the larger pump is connected to a crank 61 on a crank shaft 62, while the piston 63 of the smaller pump is connected to another crank 64 on the same crank shaft. The two cranks are parallel with each other so that the pistons 60 and 63 work in unison. The cylinder spaces below the pistons, which are used for displacing the sea-water, are interconnected by means of a pipe 65. The effective radius of the crank 64 is variable, in order to permit varying the length of stroke of the piston 63 and thus the volume of concentrated salt solution discharged through the pipes L3, N3 from the precipitating or separating vessel. A pump arrangement of this kind may be used to advantage on board ships to take care of sea-water of varying contents of salt.

Figure 9:
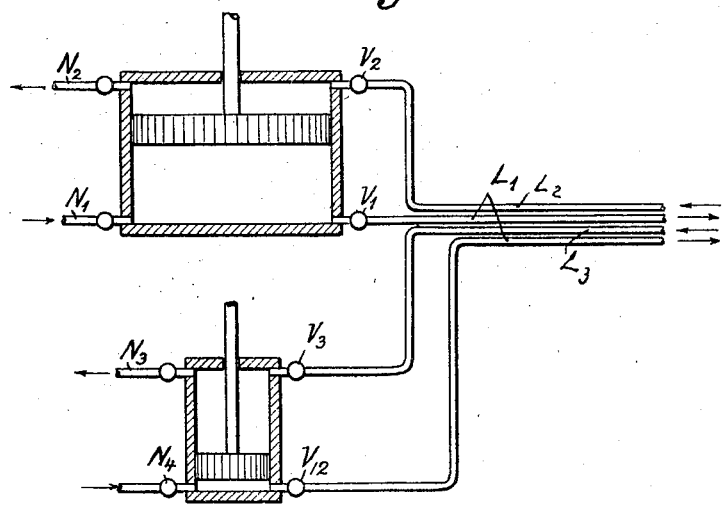

According to Fig. 9 two piston type pumps are driven entirely independently of each other. The sea-water enters the pump aggregate through the pipes N1, N4, while the fresh water and the concentrated salt solution leaves the system through the pipe N2, N3. The volume of the concentrated salt solution leaving the system per unit of time may obviously be varied as desired by varying the speed of the smaller pump. The higher the percentage of salt of the solution to be purified is, the high should be the speed of the small pump.

Because, as previously mentioned, certain of the salts held in solution in the sea-water precipitate already in the heat exchanger, provisions should be made to enable cleaning of the heat exchanger either continuously or from time to time. Fig. 10 shows a double high pressure heat exchanger, which may be cleaned by using only one half at the time and cleaning the other half. The pipes of the two temperature exchangers are designated L11, L12, L13 and L21, L22, L23 respectively, the pipes L11 and L21 being passed by the sea-water. When the temperature exchanger L11, L12, L13 is being used, the other temperature exchanger L21, L22, L23 may be cleaned by flushing sea-water at a high speed through the pipe L21, and vice versa. The sequence of operations of the various shifting valves indicated in the figure in connection with the change-over from one half of the temperature exchanger to the other half is obvious.

In Fig. 11 is shown an apparatus, which is particularly suitable when it is desired to produce drinking water in smaller quantities, for example on board ships, without the use of any high pressure pumps. The pressure receiver R1 is arranged to be heated by means of an electric heating coil 75, by means of a flame or in other suitable manner. Another pressure receiver R3, which is not heated, is arranged at a higher level than the receiver R1. The supply conduit L1 extends from the bottom of the receiver R3 to the receiver R1 near the bottom of the latter, while the discharge conduit L2 for fresh water extends from the top of the receiver R1 to the top of the receiver R3. The conduits L1 and L2 are arranged to form a temperature or heat exchanger. The receiver R3 is provided with filling and draining cocks 76 and 77 as well as with a safety valve 78.

When it is desired to use the apparatus the valves 76 and 77 are first opened and the apparatus flushed through with sea-water, whereupon the valves 76 and 77 are closed and the receiver R1 heated by passing an electric current through the heating coil 75. On account of thermosiphonic action a circulation in the liquid is set up, and in addition the pressure rises. The volumes of the receivers R3 and R1 must be so adapted to each other that on the one hand the pressure rise will not become too small and on the other hand not unnecessarily much water is driven out through the safety valve 78. As a suitable value for the ratio between the volumes of the receivers R3 and R1 may be given the number 30:1 to 40:1. By avoiding the application of heat to the lower portion of the receiver R1, the circulation is started in the correct direction. After the critical temperature has been passed and the necessary pressure reached, the purified water will rise through the conduit L2 while giving off its heat to the conduit L1 and up to the upper portion of the receiver R3, while salt solution will fall from the bottom of the receiver R3 through the conduit L1 down to the receiver R1 while absorbing heat. After all the water in the receiver R3 has been relieved of its salt and the concentrated salt solution has collected in the receiver R1, the latter is permitted to cool, whereupon the valves 76 and 77, possibly only the latter one if there is still a super-pressure in the system, are opened and drinking water is tapped out. In this case a filter is generally not required, since the small amount of salt which might whirl along with the fresh water, about .1%, is of no consequence for the drinking water.

If the ratio between the volumes of the receivers R3 and R1 is not properly determined, it may happen that during the cooling period the receiver R1 is filled with steam which causes a violent circulation through the conduits L2, L1. In order to prevent salt solution from the bottom of the receiver R1 to be carried up into the receiver R3, the conduits L2 and L1 may be choked during the cooling period by choking means, not shown, for example automatically under electric control from the circuit of the heating coil 75.

In the manner mentioned in connection with Fig. 4 it may also in the apparatus according to Fig. 11 be suitable to provide a separate lower receiver R2, in which salt or concentrated salt solution respectively is collected. If, however, the receivers R3 and R1 are correctly dimensioned with respect to each other there will hardly be any need for the extra receiver R2. A correct dimensioning of the receivers R1 and R3 furthermore entails the advantage that normally the safety valve 78 need not operate and therefore may be substituted by a bursting plate.

The receiver R1 of the various embodiments described may suitably be heat-insulated in the manner indicated in Fig. 12. The receiver proper may be made of a chemically resistive material. For salt water it will suffice with stainless steel or Monel metal, but in other cases a more expensive material, for example silver or platinum, may be required. In such cases the receiver R1 is made with thin walls. The receiver may be surrounded by a finely divided material, for example sand 79, which is enclosed in a strong cover 80 of metal, for example iron. Through a pipe 81 the space between the receiver R1 and the cover 80 communicates with the supply conduit L1. It may, however, be more suitable to connect the pipe 81 to a part of the conduit L1 having a lower temperature. The cavities between the grains of sand are filled with water of the same pressure as that prevailing within the receiver R1, involving that the walls of the vessel R1 are not subjected to any resulting pressure difference. The sand should be fine-grained, so that the water or steam does not transmit too much heat to the envelope 80 through convection. The envelope may be surrounded with another insulating material, not shown, which must be so dimensioned, however, that the temperature of the envelope 80 does not become too high.

My invention is, of course, not limited to the various embodiments described above and illustrated on the drawings, but modifications in different respects are conceivable without receding from the idea of the invention.

I claim:

1. In the separation of solid, non-volatile solutes from their solutions in liquid solvents, the process which comprises passing such a solution into a separation zone maintained under a pressure exceeding the critical pressure of the solvent and at a temperature exceeding the critical temperature of the solvent, retaining the solution in said zone until a separation has taken place wherein a fraction rich in solvent collects above a fraction rich in solute, separately withdrawing the solvent-rich fraction and the solute-rich fraction from said zone, passing said fractions separately in heat-conducting relationship with a mass of the solution to be treated, maintaining both of the said fractions and the solution to be treated at pressures exceeding the critical pressure of the solvent during the heat transfer therebetween and separately recovering the solute and the solvent.

2. The process of claim 1 wherein the said solvent is water.

3. The process of claim 1 wherein the solvent is water and the solute is a salt.

4. The process of claim 1 wherein the solution treated is sea water.

5. The process of claim 1 wherein the said separation zone is constricted so as to divide it into upper and lower chambers from which said solvent-rich and said solute-rich fraction, respectively, are withdrawn.

6. In the separation of solid, non-volatile solutes from their solutions in liquid solvents, the process which comprises continuously passing such a solution into an elongated, vertically-disposed, high-temperature, high-pressure zone at a point between the top and the bottom of said zone, maintaining said zone at a temperature above the critical temperature of the solvent and at a pressure above the critical pressure of the solvent, retaining the solution in said zone until a separation has been effected wherein a solvent-rich fraction collects at the top of said zone and a solute-rich fraction collects at the bottom of said zone, separately withdrawing the solvent-rich and solute-rich fractions from the zone, continuously passing said fractions separately in heat-conducting relationship with the incoming solution to be treated, maintaining the separated fractions and the solution to be treated at pressures exceeding the critical pressure of the solvent during the heat transfer therebetween and separately recovering the solute and the solvent.

7. The process of claim 6 wherein the said solvent is water and the solute is a salt.

8. The process of claim 6 wherein the solution treated is sea water.

9. The process of claim 6 wherein the said high-temperature, high-pressure zone is constricted so as to divide it into upper and lower chambers from which the solvent and the solute are withdrawn.

10. In the separation of salts from aqueous solutions thereof, the process which comprises continuously passing an aqueous salt solution into a high-temperature, high-pressure zone at a point between the top and the bottom of said zone, maintaining said zone at a temperature above the critical temperature of water and at a pressure above the critical pressure of water, retaining the solution in said zone until a separation has been effected wherein water collects above a salt-rich fraction in said zone, separately withdrawing the water and the salt-rich fractions, passing said fractions in counter-current heat-conducting relationship to the salt solution to be treated while maintaining the said fractions and the salt solution at pressures above the critical pressure of the water and separately recovering the salt and the water.

BALTZAR CARL von PLATEN.

REFERENCES CITED

The following references are of record in the file of this patent:

UNITED STATES PATENTS

| Number | Name | Date |
|---|---|---|
| 351,082 | Williams | Oct. 19, 1886 |
| 2,249,767 | Kistler | July 22, 1941 |
| 2,272,345 | Kobe | Feb. 10, 1942 |
| 2,330,221 | Keimer | Sept. 28, 1943 |

OTHER REFERENCES

Handbook of Chem. and Physics, 25th edition, 1941–1942, page 2189.